Figure 1:
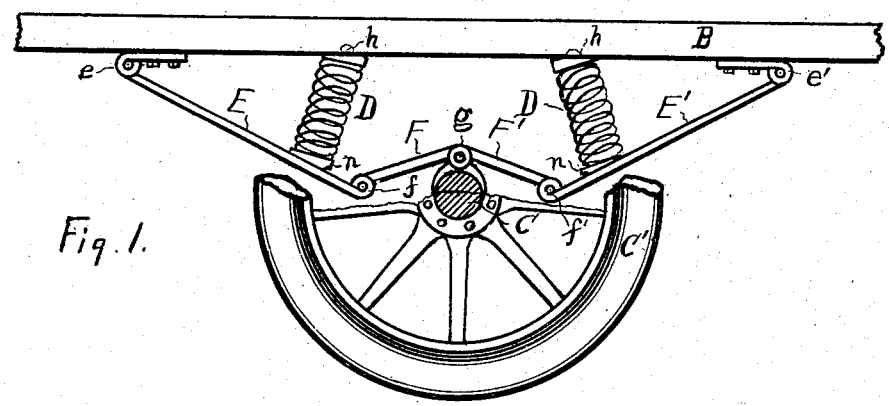

P. D. RANDALL.
COMBINATION VEHICLE SUSPENSION SPRING.
APPLICATION FILED FEB. 10, 1916.

1,205,390.

Patented Nov. 21, 1916.

WITNESSES:
J. F. Huebner
F. E. Boeger

INVENTOR
Paul D. Randall.
BY
Francis C. Huebner,
ATTORNEY

UNITED STATES PATENT OFFICE.

PAUL D. RANDALL, OF FRESNO, CALIFORNIA.

COMBINATION VEHICLE SUSPENSION-SPRING.

1,205,390.  Specification of Letters Patent.  Patented Nov. 21, 1916.

Application filed February 10, 1916. Serial No. 77,519.

*To all whom it may concern:*

Be it known that I, PAUL D. RANDALL, a citizen of the United States, and a resident of the city of Fresno, county of Fresno, and State of California, have invented a new and useful Combination Vehicle Suspension-Spring, of which the following is a specification.

My invention relates to vehicle springs, and especially to that type which is adapted for use on automobiles or fast traveling carriages in which there is a large amount of vibration.

The objects of said invention are to have approximately uniform resiliency whether loaded with heavy loads or light loads, to have resiliency without danger of breaking the springs by the rebound when traveling over rough roads, and to have the spring self adjustable under various strains. I accomplish these objects by the device hereinafter described and shown on the drawing accompanying this specification in which—

Figure 2:
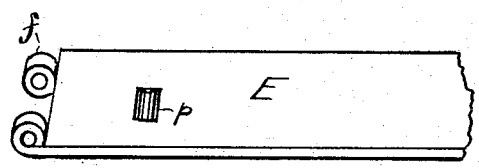
Figure 3:

Figure 1 shows a portion of the girder or beam of the chassis of the vehicle, the rear axle, and the combination suspension spring connecting the girder and the axle. Fig. 2 shows a portion of the spring rest lever showing the detent therein for receiving the spring rest. Fig. 3 shows the cup or spring rest.

In said drawing B represents a portion of one of the beams or girders of the chassis of an automobile.

C is the rear axle of the machine, and C' is the wheel thereon, parts thereof being cut away to show the spring more clearly.

E and E' are spring rest levers, hinged at one end with hinges $e$ and $e'$ to said beam B in such relation that they will swing on a common parallel plane with beam B. The hinges $e$ and $e'$ should be made broad to avoid side play in the hinge.

$n$ is a cup having a projection $n'$ on the bottom thereof which fits into a depression $p$ on the top of spring lever rests E and E', said cup $n$ being a receptacle for the coil spring D hereinafter described.

$h$ is a depression or detent in the beam on the underside thereof into which the projection $n'$ on cup $n$ will loosely fit. The depressions $p$ and $h$ and the projection $n'$ are such that the cups $n$ can have a slight swinging motion on the plane parallel with the plane of the movement of the levers E and E'.

D and D' are compression springs, preferably of the coil type, which are placed between the beam B and the levers E and E', and rest in cups $n$, the object of cups $n$ being to hold the springs in such position.

F and F' are straps which are hinged at one end to the levers E and E' with hinges $f$ and $f'$, said straps being hinged at the other end with hinges $g$ to the axle C.

It will be noted that when a weight is placed on the beam B, the straps F and F' carry the weight to the springs, and when more weight is placed on the beam the axle C is forced nearer the beam, and a shorter leverage is had from the points where levers E and E' are attached to the beam, and the point of suspension on the axle. The heavier the weight on beam B, the more direct is the application of springs D and D'. It will also be noted that in case of a sudden rebound of the load when the vehicle is traveling over rough roads, the straps F and F' will absorb such rebound and prevent the spring from breaking.

I claim as my invention and desire Letters Patent upon:

1. A vehicle spring consisting of the beam upon which the load of the vehicle is carried, levers hinged at opposite ends to the under side of said beam so they will swing on a vertical plane with said beam, an axle, straps hinged at one end to said axle, one of said straps being hinged at the other end to each of said levers opposite to the end which is hinged to said beam, and coil springs placed between the levers and beam, constructed to normally hold the levers apart from the beam, all substantially as described.

2. A vehicle spring consisting of a beam, an axle, two levers hinged to said beam on the under side thereof in such relation that they will swing on a vertical plane common with the beam, a strap hinged to the end of each of said levers, and at the other end to the axle, and compression springs arranged between the lever and the beam to normally hold the lever away from the beam all substantially as described.

3. In a vehicle spring the combination of a beam having levers hinged on the under side thereof in such relation that they will swing on a common vertical plane with the beam, spring retainers consisting of a cup shaped member, one of which is attached to the upper side of each of said levers, and two of which are attached to the under side of said beam in such relation that when the lever is swung approximately parallel with the beam the cup in the beam will be directly opposite the cup in the lever, said cups being constructed with a transverse projection on the bottom thereof, and corresponding depressions being formed in said levers and beam so that when the cups are assembled with the lever and beams they have a slight rocking motion on a common plane with the movement of said levers, and compression springs constructed to fit in said cups and to be placed between the beam and the levers so the lever will normally be held apart from the beam, and straps hinged at one end to each of said levers and at the other to the axle, all substantially as described.

PAUL D. RANDALL.

Witnesses:
M. G. WATERBURY,
HAZEL SIMPSON.

Copies of this patent may be obtained for five cents each, by addressing the "Commissioner of Patents, Washington, D. C."